United States Patent
Pallingen et al.

[11] 3,892,493
[45] July 1, 1975

[54] LIGHT MEASURING PROCESS AND APPARATUS

[75] Inventors: Hans-G Pallingen; Alex Vinatzer; Wolfgang Kapfinger, all of Brixen, Italy

[73] Assignee: Durst Ag. Fabrik Fototechnischer Apparate Bozen, Bozen, Italy

[22] Filed: June 25, 1973

[21] Appl. No.: 373,391

[30] Foreign Application Priority Data
June 24, 1972  Italy.............................. 26164/72
May 23, 1973  Italy.............................. 4842/73

[52] U.S. Cl............................. 356/226; 250/211 R
[51] Int. Cl............................................. G01j 1/46
[58] Field of Search........................... 350/160 LC; 356/93–97, 205, 223, 225–227; 250/211 R

[56] References Cited
UNITED STATES PATENTS
3,575,491  4/1971  Heilmeier..................... 350/160 LC
3,684,378  8/1972  Lord............................ 356/97 X Primary Examiner—Ronald L. Wibert
Assistant Examiner—F. L. Evans
Attorney, Agent, or Firm—Connolly and Hutz

[57] ABSTRACT

A photodiode and a signal storing capacitor are cyclically operated in alternate connection to an output circuit. A synchronized shutter alternately shields the photodiode from the light being measured while the capacitor is being charged and uncovers it to generate a light measuring signal. The capacitor discharges into the output circuit together with the light measuring signal to cancel the error portion of the signal from that corresponding to the amount of light being measured. The output from the photodiode is connected into an amplifier which is connected to a switching circuit including a charge-storing capacitor. The shutter is mechanically or electronically operated through a pulse generator, which also synchronizes the charging and discharging of the storage capacitor and the phase of connection of the output signal to an accumulator which provides a stationary indicating signal. An electronic shutter for alternately covering and uncovering the photodiode is provided by a liquid crystal.

17 Claims, 1 Drawing Figure

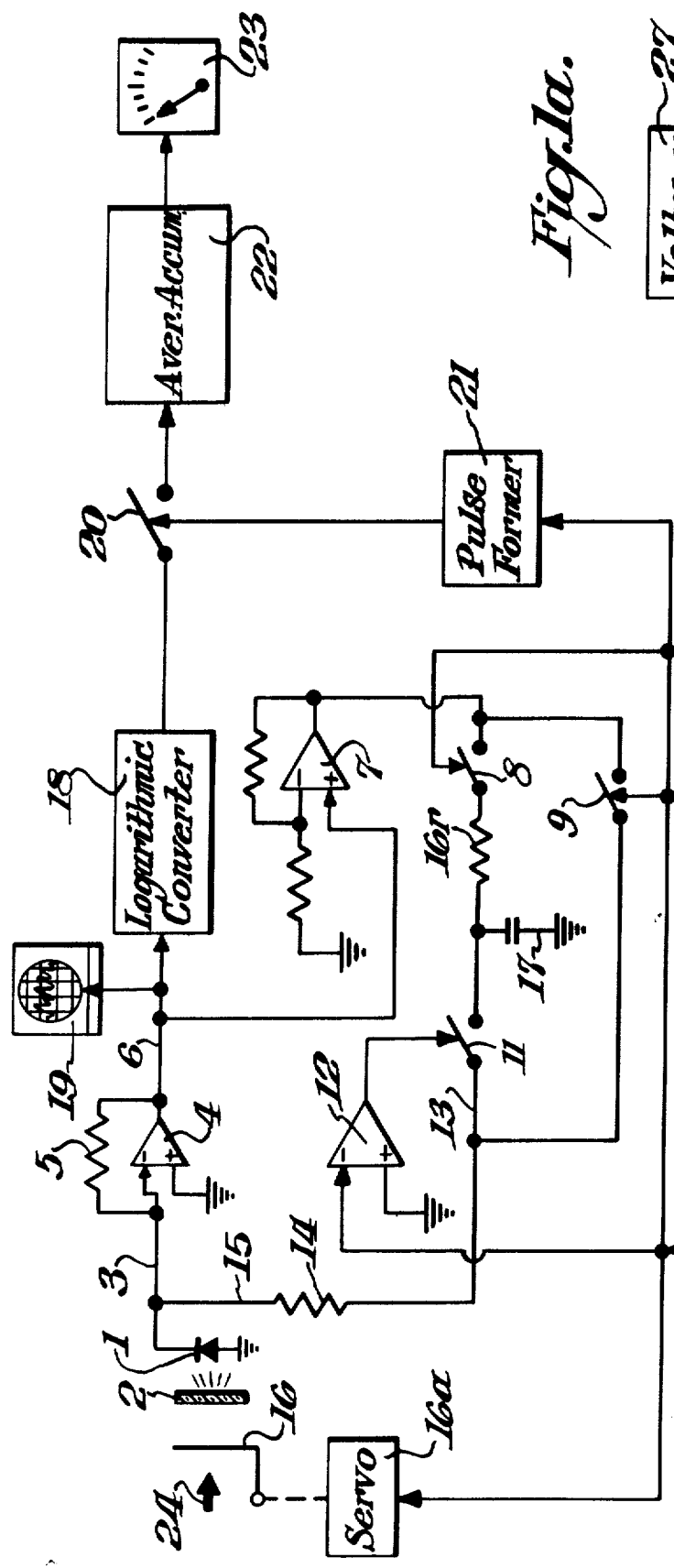
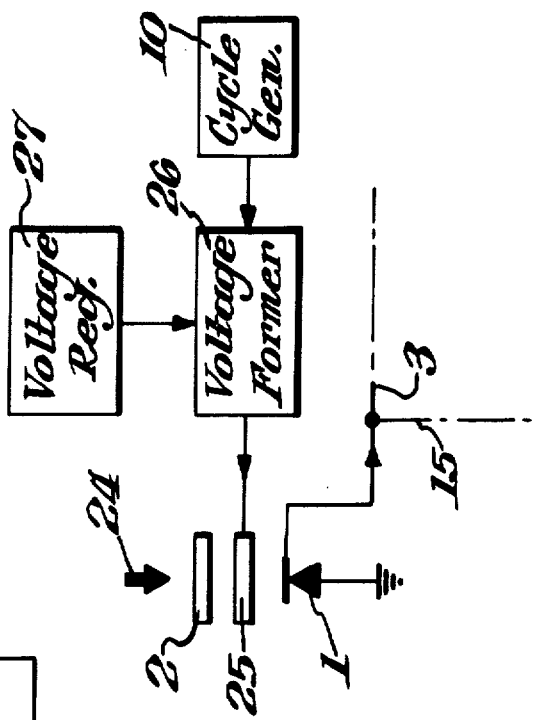
Fig.1.
Fig.1a.

LIGHT MEASURING PROCESS AND APPARATUS

BACKGROUND OF THE INVENTION

The invention relates to a light measuring process and apparatus. With light meters of great sensitivity, such as are used in a wide diversity of graphic and photographic applications and in which the measuring signals are produced in photoelectric cells, the photoelectric cells usually consist of photomultipliers. Such apparatus has the particular disadvantage that, because the response of the photomultiplier varies because of aging and exposure to temperature, frequent recalibration of the zero point or of certain measuring points is required. This makes the reliability of the test readings dependent to a great extent on the skill and experience of the operator who performs the measurements.

Furthermore, photomultipliers must be protected from extremely strong light and must therefore be exposed only to the light to be measured.

In addition, in the known apparatus, the photomultipliers are disadvantageously sensitive to vibration and require a high supply voltage, both of which require protective measures.

An object of the invention is to provide a light meter, which can be accurately operated without recalibration of its zero point or of certain measuring points.

A further object of the invention consists of providing a light meter, which in the same scope of application in which photomultipliers are normally used, employs other photoelectric cells, wherein the aforementioned disadvantages are avoided and which now makes it possible to measure pulsating light.

SUMMARY

The objects of this invention are satisfied by a light measuring process, according to which an automatic zero balancing results. The light impinging upon a photoelectric cell is modulated by a suitable light blocking or shutter device, which in an alternating sequence first blocks, shields or darkens the light impinging on the photoelectric element and then releases it. The signal obtained from the shielded photoelectric cell is intensified by a measuring signal amplifier and is stored by suitable electrical circuit components and configurations. The stored signal is discharged, in the actual measuring phase, during which the photoelectric element is exposed to the light being measured, to partially counteract the signal beamed from the fully exposed photoelectric cell in such a manner that the light measuring signal is reduced by a factor corresponding to the stored signal.

In an advantageous apparatus for the carrying out the aforementioned process, a photodiode is used as the photoelectric cell. The photodiode is connected with the input of a signal measuring amplifier, such as a differential amplifier. The output of the measuring signal amplifier is connected with an indicating device as well as with the input of a second amplifier, whose output is alternately connected and interrupted by means of a switch controlled by an pulse generator, with a capacitor. At the same time a shutter device, controlled by the same pulse generator in an alternating manner, first shields or covers the photodiode and then uncovers it so that the measuring light may impinge upon it.

In a further development of the invention, the mechanical shielding device or cover is replaced by a liquid crystal cell shutter device controlled accordingly in an electronic manner.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a schematic electrical circuit diagram of a novel light meter which is one embodiment of this invention; and FIG. 2 is a diagram of an electronic shutter device for the modulation of the measuring light with the aid of a liquid crystal cell, which can be substituted in FIG. 1 to form another embodiment of this invention.

DESCRIPTION OF THE PREFERRED EMBODIMENT

In the illustrated photoelectric cell, e.g. photodiode 1, there is obtained a signal in accordance with the intensity of the light to which it is exposed. The signal is conducted by way of a conductor 3 to a measuring signal amplifier 4 in whose negative feedback circuit is disposed resistor 5. Filter 2 is deployed in the beam of the light to be measured in front of photodiode 1. The output signal of amplifier 4 is transmitted by way of conductor 6 to a further amplifier 7, whose output signal is connected to two electronic switches 8 and 9.

Switches 8 and 9 are controlled by pulse generator 10 and are opened or closed accordingly. A further switch 11 is controlled by the same pulse generator 10 through amplifier 12 in which the pulses reverse polarity. Switch 11 is therefore, closed when switches 8 and 9 are opened, and the reverse.

With switches 8 and 9 closed and switch 11 open, the output signal of amplifier 7 is fed back to the input of amplifier 4 by way of conductor 13, resistor 14 and a further conductor 15. Since switch 8 is closed simultaneously with switch 9, capacitor 17 is then charged through resistor 16r.

After the charging period of capacitor 17 is completed, switches 8 and 9 are opened and switch 11 is simultaneously closed. Capacitor 17 thus becomes discharged through conductor 13, resistor 14 and conductor 15 to cause a resultant current to flow toward the input of amplifier 4. During the time that capacitor 17 is being charged (which is referred to as the equalizing or balancing phase) photodiode 1 is shielded from the incident light by a suitable shielding device, e.g. a mechanically operated diaphragm or shutter 16. The activation of shutter or diaphram 16 in an alternating sequence shields the photodiode 1 and uncovers it. Shutter device 16 is synchronously controlled by means of servomechanism 16a operated by pulse generator 10, which also operates switches 8, 9, 11. During the equalizing phase, the voltage and current changes resulting from temperature and aging are cancelled by the described control system at the input of amplifier 4 because at the same time, capacitor 17 is charged up to a voltage corresponding to these changes.

In the second or actual measuring phase, switches 8 and 9 are opened and switch 11 is closed. At the same time, photodiode 1 is uncovered by the shutter device, so that the light to be measured may entirely impinge on photodiode 1.

The signal resulting from photodiode 1 is reduced at the input of the amplifier by the discharging current of capacitor 17 flowing through conductor 15. The discharging current also includes a major component corresponding to the errors in the measuring signal amplifier 4 resulting from the influence of temperature and aging reactions.

In this manner, there appears at the output of amplifier 4 at each measurement a signal, which is independent of the effects of errors so that a recalibration of the zero or measuring point is no longer necessary.

The output signal of amplifier 4 is converted to logarithmic in logarithmic amplifier 18 and conducted by means of electronic switch 20 and accumulator 22 to an analog or digital registering indicator unit 23. Electronic switch 20 is controlled by an associated pulse former 21, which is connected to pulse generator 10 in such a manner that accumulator 22 is connected during the measuring phase with the output of the logarithmic amplifier 18 and cannot be discharged during the equalizing phase.

Accumulator 22 may be constructed and arranged as an average value or peak value storage device and serves for the purpose of obtaining a stationary indication on the indicating apparatus 23 during the operating cycle. The use of a peak value accumulator makes the apparatus suitable also for measurement of pulsating light, because the pulse amplitude is indicated as the measured value.

At the output of amplifier 4 there is furthermore provided a terminal for oscilloscope 19 or other modulating apparatus by means of which the impulses given off by the light source may be displayed.

In FIG. 1a is illustrated a further embodiment of the light measuring apparatus of this invention comprising a shutter device different from that shown in FIG. 1. In the path of beam of the light 24 to be measured is positioned a liquid crystal cell 25 in front of photoelectric cell 1. Liquid crystal cell 25 is, for example, an electronic shutter utilizing a liquid crystal, for example, of the type shown in U.S. Pat. No. 3,700,306. At the electrodes of cell 25 there is applied an alternating current produced by a voltage former 26 in such a manner that the measuring light in an alternating cyclic sequence first passes through the liquid crystal and impinges on the photoelectric cell 1 and then is alternately absorbed in the same liquid crystal cell. Voltage former 26 is controlled by pulse generator 10, which causes a modulation of the measuring light synchronously with operating cycle of the previously described switches 8, 9, 11 and 20. The light metering apparatus therefore functions in the same manner previously described, with the distinction that mechanically moving parts are no longer present.

Since the diffusing or absorbing effect of liquid crystal cell 25 depends on voltage, the amplitude of the voltage conducted to the liquid crystal cell 2 may be continuously regulated by a supplemental regulating device 27 connected to voltage former 26.

Thereby the liquid crystal cell 25 also takes over the function of a diaphragm, such as are needed to protect various photoelectric cells during strong light incidence.

Filter 2 may be so eliminated in the embodiment of FIG. 1a because one or both layers confining the liquid crystals may be constructed as filters.

We claim:

1. A process for measuring light with great sensitivity in graphic and photographic applications by a photoelectric transducer connected to an indicating circuit which comprises the steps of utilizing a photodiode as the photoelectric transducer, cyclically and alternately shielding the photodiode from the light and exposing it to the light, storing the signal from the indicating circuit while the photodiode is shielded from the light, amplifying the output of the photodiode in the indicating circuit, discharging the stored signal into the indicating circuit before it is amplified simultaneous with generation of the light measuring signal while the photodiode is exposed to the light whereby the error portion of the light measuring signal is cancelled, and the error portion of the signal resulting from changes in amplification is also cancelled.

2. A process as set forth in claim 1 wherein the photodiode is mechanically shielded from and exposed to the light.

3. A process as set forth in claim 1 wherein the photodiode is electrically shielded and exposed.

4. A light measuring device having great sensitivity for graphic and photographic applications comprising a photodiode for generating an electrical signal when light impinges upon it, a shutter device disposed in front of the photodiode for alternately shielding the photodiode from the impinging light and uncovering it for exposure to the light in a cyclic sequence, the photodiode being electrically connected to an indicating circuit and to a signal storage circuit, a switching means in the signal storage circuit whereby signals are alternately stored and discharged into the indicating circuit, a cycle generating means connected to the shutter device and to the switching means whereby signals are stored in the storage circuit when the shutter device shields the light from the photodiode and signals are discharged into the indicating circuit when the photodiode is exposed to light and generates a light measuring signal to cancel out the error portion of the light measuring signal, the indicating circuit including an amplifier having an input and an output, the output of the amplifier being connected to the signal storage circuit, and the signal storage circuit also being connected to the input of the amplifier whereby the error portion of the signal resulting from changes in amplification is also cancelled.

5. A light measuring device as set forth in claim 4 wherein the cycle generating means comprises a pulse generator.

6. A light measuring device as set forth in claim 4 wherein electronic switches connect the indicating circuit to the signal storage circuit and the signal storage circuit back into the input to the amplifier, and a pulse generator is connected to the shutter device and the electronic switches for synchronizing them.

7. A light measuring device as set forth in claim 4 wherein the indicating circuit includes an averaging indicating device whereby a stationary indication of the pulsed output is provided.

8. A light measuring device as set forth in claim 7 wherein a switching device is connected in front of the averaging device, and the switching device is connected to the cycle generating means whereby the averaging indicating device is operatively connected only when light signals are being measured.

9. A light measuring device as set forth in claim 4 wherein the shutter device comprises a mechanical shutter which alternately shields the photodiode from and exposes it to the light.

10. A light measuring device as set forth in claim 4 wherein a second amplifier is connected to the output of the first mentioned amplifier between the indicating circuit and the signal storage device, electronic switches are included in the signal storage device, and the cycle generating means being connected to the electronic switches for storing signals during an equalizing phase and discharging the signals during a light measuring phase.

11. A light measuring device as set forth in claim 4 wherein the shutter device comprises a liquid crystal, and a voltage generator connects the cycle generating means with the liquid crystal wherein it is alternately operated to transmit and absorb light.

12. A light measuring device as set forth in claim 11 wherein a voltage regulator is connected to the voltage generator for maintaining the voltage applied to the liquid crystal in its shielding phase substantially constant.

13. A light measuring device as set forth in claim 4 wherein a filter is disposed in front of the photodiode.

14. A light measuring device as set forth in claim 12 wherein the shutter device comprises a liquid crystal having a sealing layer, and the sealing layer comprises a filter.

15. A light measuring device as set forth in claim 4 wherein a wave monitoring device is connected to the indicating circuit.

16. A light measuring device as set forth in claim 4 wherein the indicating circuit comprises a logarithmic amplifier and an averaging indicating device.

17. A light measuring device as set forth in claim 4 wherein the signal storage device includes capacitor means.

* * * * *